United States Patent [19]

Rabe

[11] Patent Number: 4,694,549
[45] Date of Patent: Sep. 22, 1987

[54] METHOD FOR REMOTELY REPLACING TUBE ENDS IN A HEAT EXCHANGER

[75] Inventor: George B. Rabe, Sparta, N.J.

[73] Assignee: Foster Wheeler Energy Corporation, Livingston, N.J.

[21] Appl. No.: 831,889

[22] Filed: Feb. 24, 1986

[51] Int. Cl.$^4$ .......................... B21D 53/00; F28F 7/00; F16L 55/18

[52] U.S. Cl. ........................... 29/157.3 C; 29/157.3 R; 29/402.08; 29/402.13; 29/DIG. 48; 138/97; 165/76

[58] Field of Search ................... 29/157.3 R, 157.3 C, 29/402.08, 402.13, 527.1, DIG. 48; 165/76; 138/97; 376/463

[56] References Cited

U.S. PATENT DOCUMENTS

| | | | |
|---|---|---|---|
| 4,347,652 | 9/1982 | Cooper, Jr. et al. | 29/157.3 C X |
| 4,576,546 | 3/1986 | Cooper, Jr. et al. | 165/76 X |
| 4,615,477 | 10/1986 | Spada et al. | 29/402.13 X |

Primary Examiner—Howard N. Goldberg
Assistant Examiner—Ronald S. Wallace
Attorney, Agent, or Firm—Marvin A. Naigur; Martin Smolowitz

[57] ABSTRACT

A method for remotely removing and replacing defective tube ends of heat exchanger tubes located adjacent a tubesheet. In the method, a rotary cutting tool is inserted into each defective tube and the tube end portion is cut at a location near the tubesheet, a weld joint between the tube and tubesheet is removed, and the defective tube is then withdrawn through the tubesheet opening. Next, the resulting exposed end of the existing tube is remotely machined using a special rotary cutting tool, then a new replacement tube is inserted through the tubesheet opening and positioned in axial alignment and interfitting engagement with the end of the existing tube, after which the rear end of the new tube is expanded firmly against the tubesheet opening. The front or inner end of the replacement tube is then expanded firmly against the inner surface of the existing tube end, in preparation for welding these tubes together. Then, the new tube is welded to the existing tube and to the tube sheet to provide pressure-tight joints and complete the replacement tube installation.

10 Claims, 4 Drawing Figures

METHOD FOR REMOTELY REPLACING TUBE ENDS IN A HEAT EXCHANGER

BACKGROUND OF INVENTION

This invention pertains to a method for remotely replacing deteriorated tube ends in a heat exchanger. It pertains particularly to a method for remotely removing the deteriorated end portion of an existing tube from a tubesheet of a heat exchanger and replacing it with a new tube aligned and welded to the end of the existing tubes and to the tubesheet.

In steam generators such as used for nuclear power plants, bundles of vertical U-shaped heat exchanger tubes are welded into a thick tubesheet located at the lower end of the heat exchanger. During operation of such steam generators over an extended period of time, such as 10 years or more, a corrosive sludge material forms and accumulates on the inner upper surface of the tubesheet. This accumulated sludge material causes corrosion of the tubes to an extent of potential or actual tube failure. To correct this serious problem without undesired replacement of the heat exchanger, it is necessary to remove the old deteriorated tube end portions from the tubesheet and replace them with new tube portions which are remotely positioned and pressure-tightly welded into place without removing and dismantling the entire heat exchanger assembly. However, because of the remote and relatively inaccessible location of the tubes and the radioactive environment which is usually involved, such tube replacement is very difficult to accomplish reliably and safely. Thus, a suitable solution to this tube replacement problem has been needed, particularly for heat exchangers used in the nuclear power industry.

Some portable equipment and procedures have been previously developed by industry for rotary trimming the ends of tubes. For example, U.S. Pat. No. 3,898,714 to McFadden discloses a pipe alignment clamp externally fitted around adjacent pipes to hold them in coaxial alignment prior to welding. U.S. No. 4,000,556 to Ciminero; U.S. No. 4,161,810 to Beard et al; and U.S. No. 4,393,564 to Martin disclose methods and apparatus for hydraulically extracting heat exchanger tubes from tubesheets. Also, U.S. No. 3,962,767 to Byerley et al shows repair of heat exchanger tubes by severing the tube, inserting a sleeve and internally welding the sleeve in place. U.S. No. 3,979,810 to Krips et al shows attachment of a tube into a plate opening by welding the tube end and also by hydraulic deforming and roll swaging the tube wall against the plate opening.

The prior art has apparently not provided apparatus and methods suitable for remotely removing and replacing deteriorated tube ends in heat exchangers, particularly those in relatively inaccessible locations and in radioactive environments which is usually involved where such tube end replacement is very difficult to accomplish reliably and safely. However, the present invention provides an advantageous and desirable solution to this tube end replacement problem by providing a method for remotely operated removal of deteriorated tube ends and their replacement with new tubes.

SUMMARY OF INVENTION

The present invention provides a method for remotely removing an existing deteriorated tube end portion from a location adjacent to and extending through a tube sheet, remotely replacing the old tube end with a new tube, and welding it in place to the existing tube end and to the tubesheet. In the method, the first step is cleaning by honing the inside of the tube in the area where it is to be cut, i.e. above the tubesheet and adjacent sludge pile and below the first support baffle of the heat exchanger. Next, a rotary cutting tool is used to remove the weld joint between the existing tube end and tubesheet, followed by the insertion of a long rotary cutting tool into the tube and severing the tube in the previously honed area. Then the deteriorated existing tube end portion is withdrawn out through the tube sheet opening, using conventional tube removal equipment.

After removal of the deteriorated tube end(s), a special rotary cutting or machining tool is inserted through the tubesheet opening and into the exposed end of the existing tube. The tube end is remotely machined on its outside surface and the tube end is chamfered at a 40°–50° angle with the tube centerline in preparation for welding it to a new replacement tube. Next a new replacement tube, having the same outside diameter and length as the original deteriorated tube removed and having its forward end swaged inwardly, is remotely inserted through the tubesheet opening and positioned in axial alignment and interfitting engagement with the existing tube end by using a special remotely operated tube alignment and positioning tool. After inserting the replacement tube inner end into the exposed end of the existing tube, the outer or lower end of the replacement tube is expanded firmly into the tubesheet opening by suitably pressurizing and expanding a rear portion of the tube alignment tool, after which the tube positioning tool is withdrawn from the heat exchanger.

To insure proper welding of the replacement tube to the existing tube end, a tube expansion tool is next inserted into the replacement tube and its inner end is remotely expanded into the existing tube to assure firm contact therebetween; then the tube expansion tool is withdrawn.

Next, the new tube expanded inner end is remotely welded to the existing tube, and the new tube outer end is welded to the tubesheet to provide pressure-tight joints therebetween. After performing such welding steps, the resulting weld joints can be heat treated if necessary or desired, then the joints pressure tested to verify the strength and tightness of the weld joints. Also non-destructive tests can be performed on the weld joint to verify proper quality of the welds.

It is an advantage of the present invention that the ends of deteriorated tubes in heat exchangers can be remotely removed and replaced reliably and safely without requiring disassembly of the heat exchanger, thus providing a substantial saving in plant outage time and maintenance costs for the heat exchanger installation.

BRIEF DESCRIPTION OF DRAWINGS

This invention will be further described with reference to the following drawings, in which.

DESCRIPTION OF INVENTION

Figure 1:
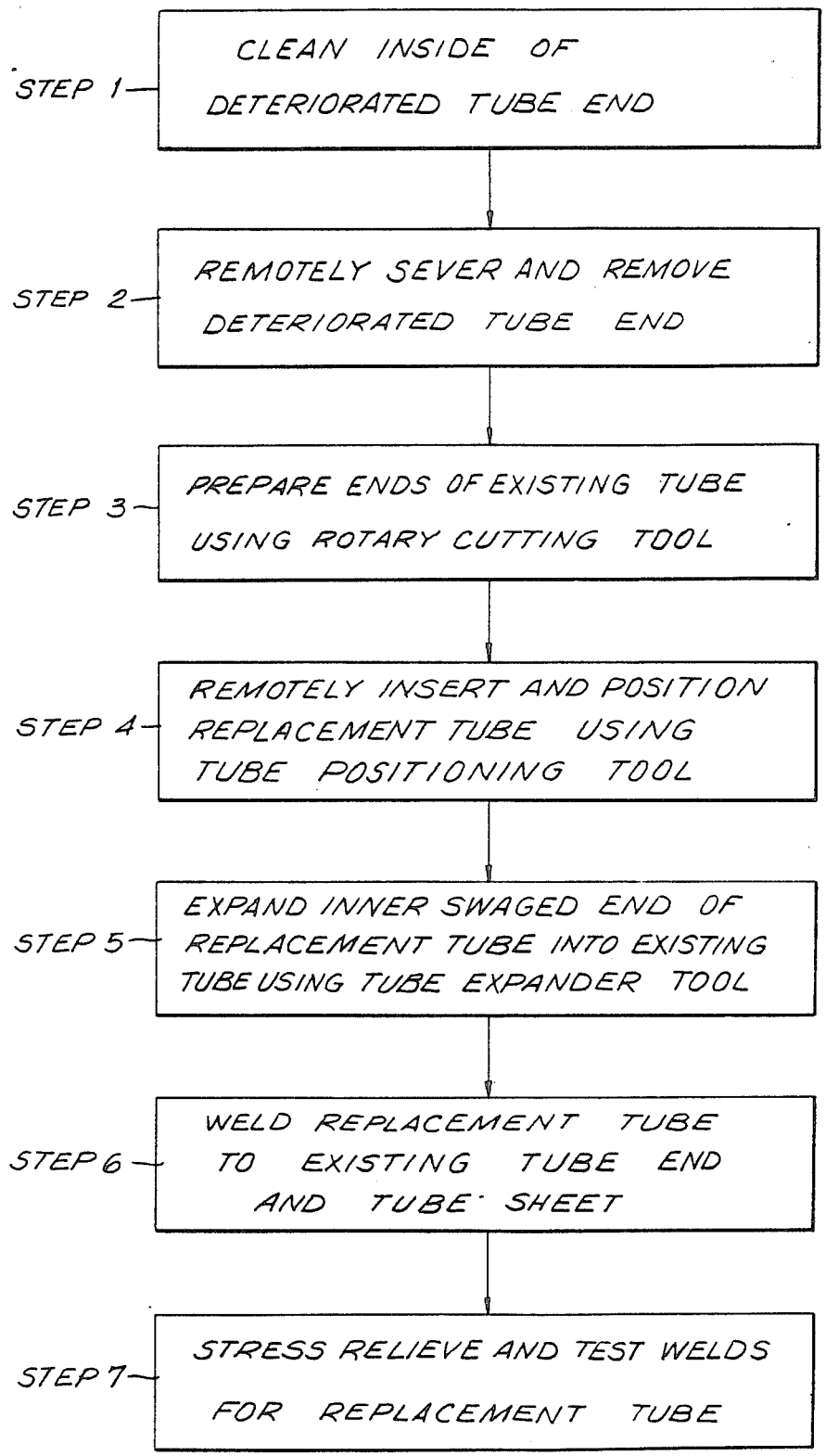
FIG. 1 is a diagram generally showing the principal method steps used for the remote removal and replacement of heat exchanger tube ends in accordance with the present invention.

In accordance with a preferred embodiment of the present invention the deteriorated end portions of heat exchanger tubes, such as located adjacent a lower tubesheet in a remotely located heat exchanger for a nuclear power plant steam generator, are remotely removed and replaced with new tubes having substantially the same diameter and length using the method of the invention. The principal successive method steps are generally shown by the FIG. 1 flow diagram, which briefly outlines the principal steps 1-7 used for tube replacement. These steps 1-7 are described in greater detail hereinbelow.

Figure 2:
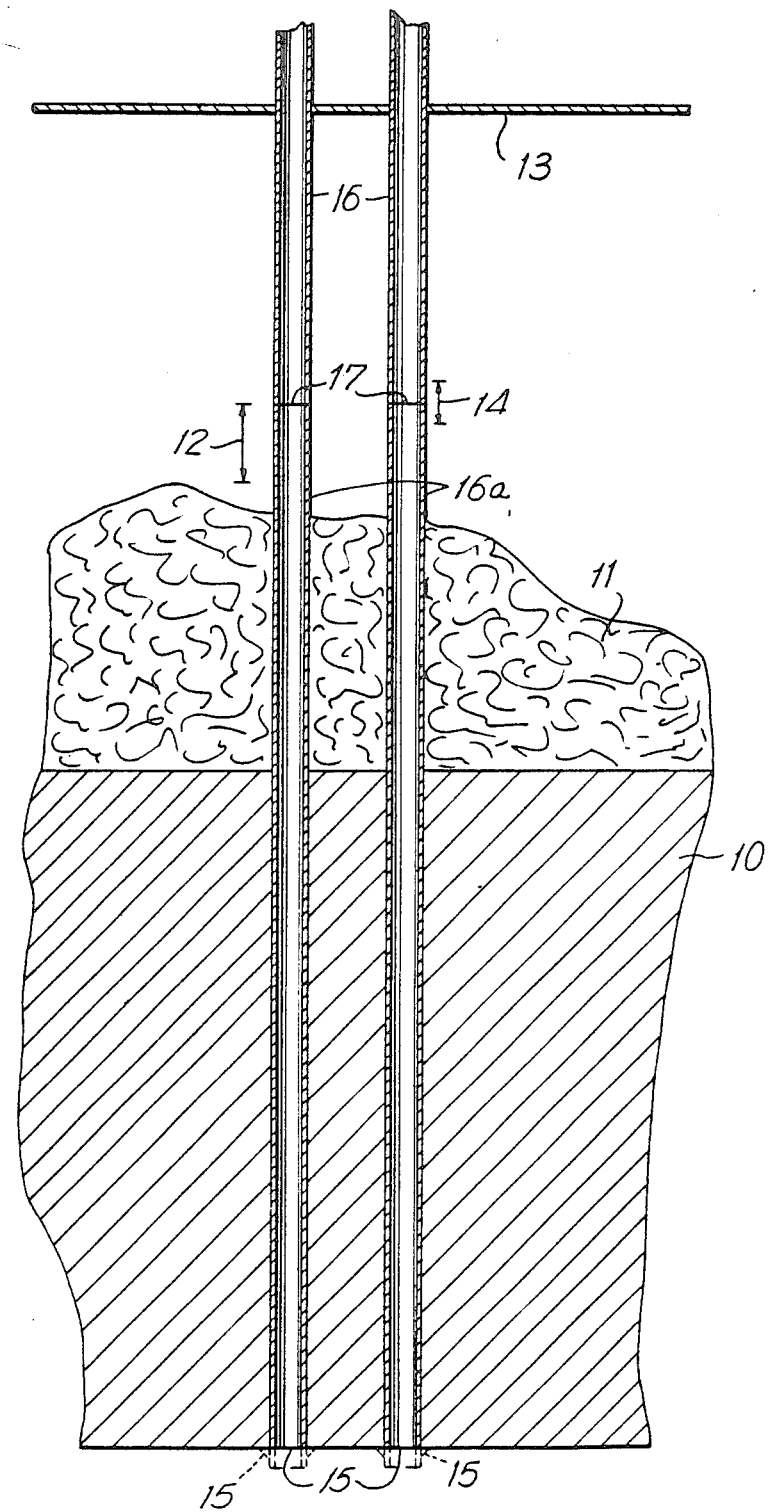
FIG. 2 is a partial cross-sectional view of a portion of a heat exchanger showing a tube and tubesheet configuration and two typical tube end portions to be remotely removed and replaced in accordance with the invention.

Referring now to the FIG. 2 drawing showing a portion of two tubes of a typical heat exchanger tube installation, the lengths of deteriorated tube ends to be remotely removed from the heat exchanger is determined by the combined thickness of the tubesheet 10 and sludge pile 11, plus a small additional length 12 of tube above the sludge pile and below the first support baffle or plate 13 of the heat exchanger. The first method step in the tube end remote removal and replacement method is locally cleaning the tube inner surface by inserting a conventional rotary honing tool (not shown) into the tube 16 and honing the tube inside surface in the area 14 where it is to be cut. Such honing removes any scale existing in the tube and provides a smooth inner surface for receiving a replacement tube end.

As a second step, the tube-to-tubesheet weld at 15 is cut off flush with the lower surface of tubesheet 10, as shown at 15a. Next, a conventional rotary cutting tool (not shown) is remotely inserted successively into each tube 16 and the tube is severed at 17 within the honed area 14, as shown by FIG. 2. After severing the deteriorated tube end portion 16a at 17, it is withdrawn from the opening in the tubesheet 10 using conventional tube pulling equipment (not shown).

Figure 3:
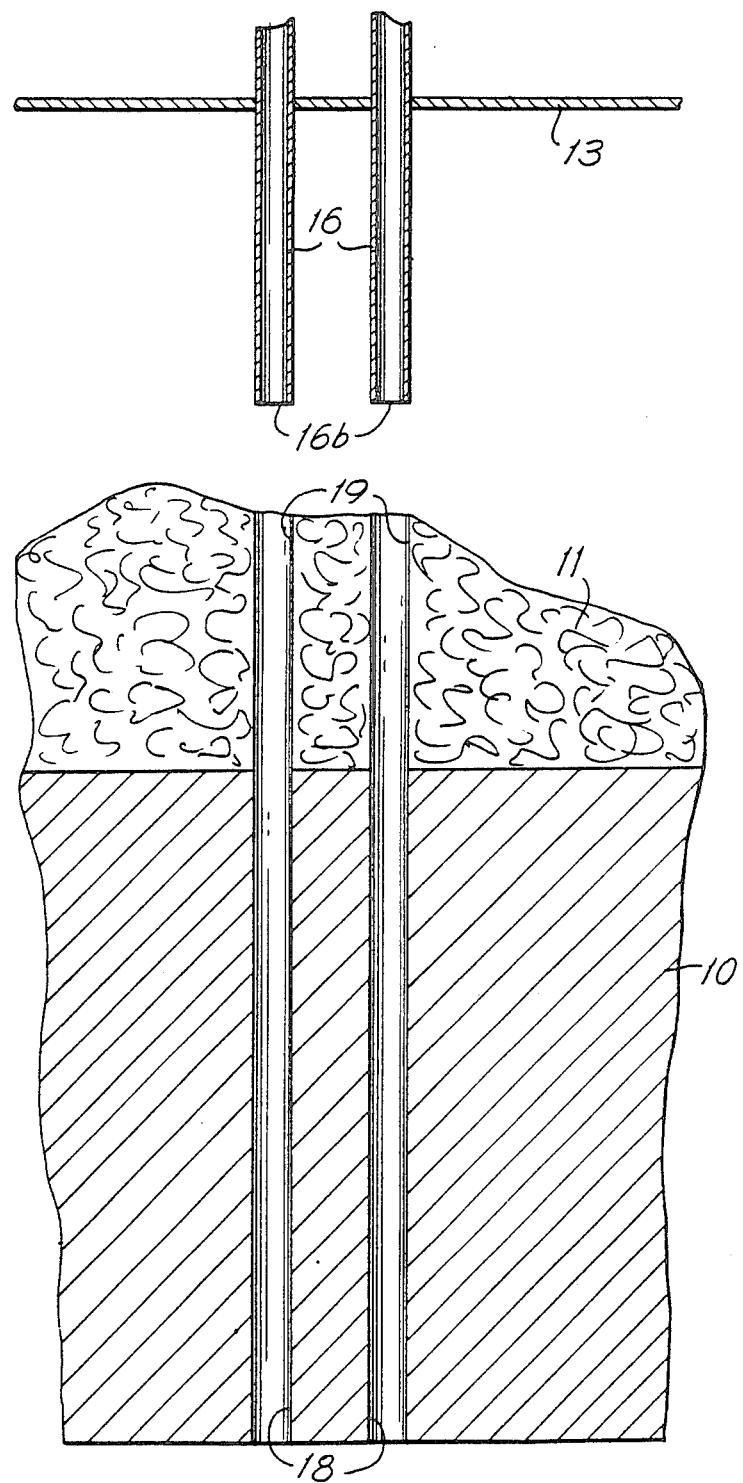
FIG. 3 shows a partial cross-sectional view of a portion of the heat exchanger configuration showing the defective tube ends removed, and showing the tube end preparation prior to installing a replacement tube.

After removal of the old tube end portion 16a from the tubesheet 10, the hole 18 in the tubesheet and a hole 19 remaining through the sludge pile 11 are cleaned as needed such as by suitable rotary equipment, as generally shown by FIG. 3. Then as a third step, the existing tube end(s) 16b is prepared suitable for receiving a replacement tube. A special rotary cutting tool device having multiple pivotable cutters located at its forward end is inserted through the tubesheet hole 18 into the tube end 16b, and the tool is rotated so as to effectively scrape the tube outside surface and also machine the tube end 16b to an angle of 40-50° with its centerline. Such machining step prepares the tube end 16b suitable for subsequent welding it to a replacement tube. The rotary cutting tool and method for its use is described in my co-pending patent application Ser. No. 06/832,545 filed Feb. 24, 1986, which is being incorporated herein by reference.

Figure 4:
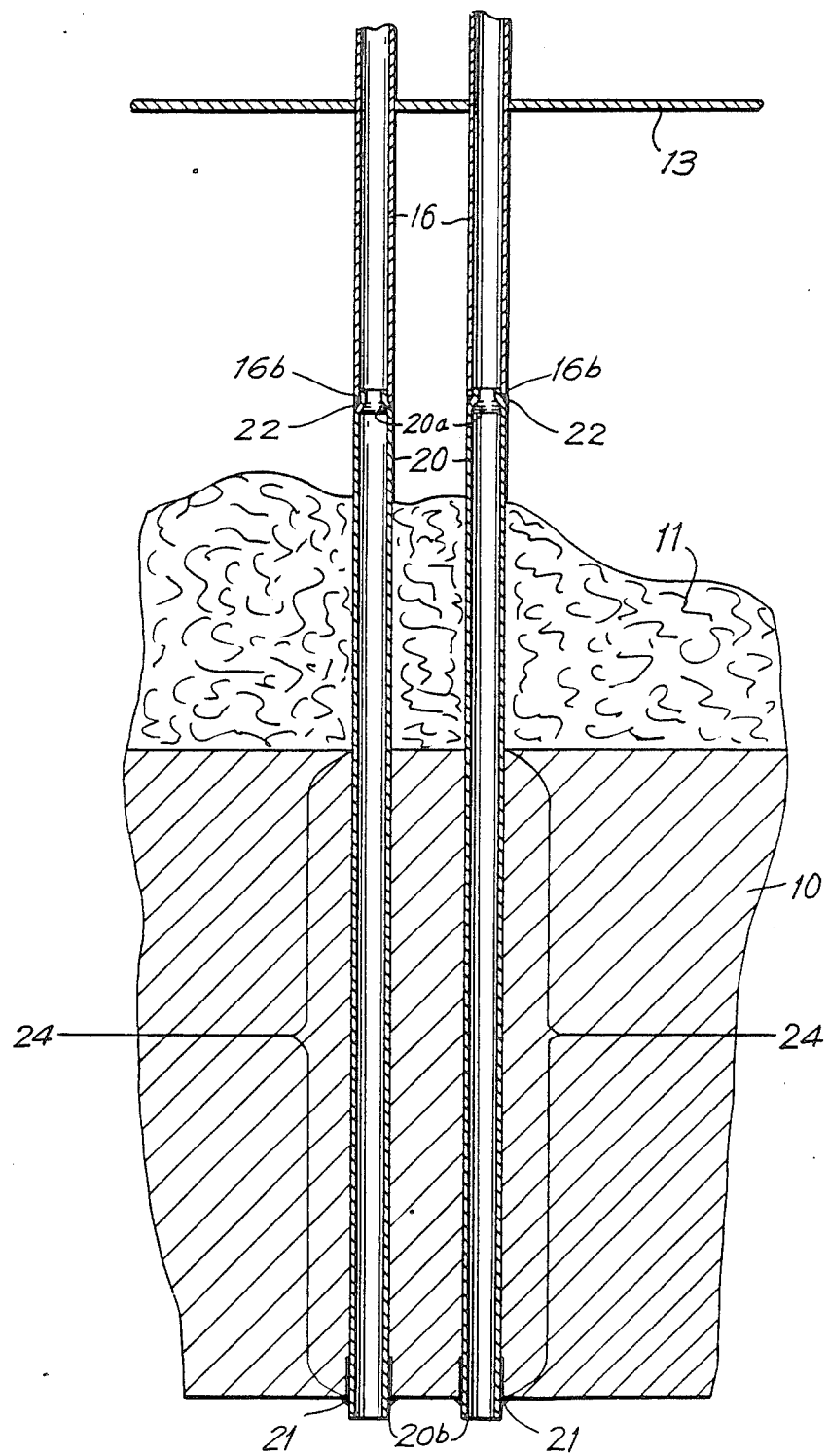
FIG. 4 shows a partial cross-sectional view of a portion of the heat exchanger showing the replacement tube remotely installed in the tube ends and tubesheet and welded in place in accordance with the invention.

Following preparation of the tube end(s) 16b, as a fourth step a new replacement tube 20 having the same diameter and length as the removed tube end portion 16a and having its forward end 20a swaged inwardly, is remotely inserted in through the tubesheet opening 18 and is positioned in axial alignment and interfitting engagement with tube end 16b, as is generally shown by FIG. 4. The tube 20 is inserted and positioned into tubesheet 10 and tube end 20a interfitted into tube end 16b using a special tube positioning tool. This tube positioning tool and method for its use is described in my co-pending patent application Ser. No. 06/833,624 filed Feb. 24, 1986, which is incorporated herein by reference.

Following positioning of the replacement tube 20 for welding to tube end 16b, as a fifth step the inner waged end 20a of the replacement tube 20 is remotely expanded firmly into the tube end 16b per FIG. 4, using an elongated tube expander tool. The expander tool is inserted into the tube 20 and pressurized so as to expand the inner swaged end 20a of the replacement tube 20 firmly into the existing tube end 16b, so as to provide a joint suitable for reliable welding. This tube expander tool and method for its use is described in my co-pending patent application Ser. No. 06/831,888 filed Feb. 24, 1986, which is incorporated herein by reference.

After the replacement tube 20 is correctly positioned and expanded in the heat exchanger, as a sixth step the tube inner end 20a is remotely welded to tube end 16b and if desired tube rear end 20b can be welded to the tubesheet 10, as generally shown in FIG. 4, using an internal bore welding torch (not shown).

Following such welding, as method step 7 the replacement tube end to tube weld joint 22 is remotely stress relieved using conventional procedures. Also, a non-destructive examination of the replacement tube end to tube weld can be preferably performed This examination may be by ultrasonic or eddy current examination or a combination of each using conventional procedures. The replacement tube end 20b is welded to the tubesheet face at 21 per FIG. 4, using conventional procedures. The replacement tube 20 is expanded firmly into the tubesheet at 24 for the entire thickness of the tubesheet per FIG. 4, usually by using explosive expansion procedures. Then both upper and lower welds are pressure tested to assure leak tightness of the joints, and thus complete the tube remote removal and replacement method steps.

This invention will be better understood by reference to the following example describing typical important parameters used for remote removal and replacement of tubes, which example should not be construed as limiting the scope of the invention.

EXAMPLE

In a vertically-oriented U-bend type heat exchanger used in the steam generator of a nuclear power plant, existing deteriorated tube end portions approximately 36 inches long are first internally honed and then remotely severed above the tube sheet, and the tubes removed. The exposed ends of the remaining tubes are then remotely machined for weld preparation by successively inserting a rotary cutting tool into the tubes, expanding the tool pivotable cutter blades and externally scraping the tubes and also machining the tube ends to a 45 degree angle for internally welding them each to a replacement tube.

Next, a new replacement tube having its forward end swaged inwardly is placed on the forward end of a tube positioning tool, and the tool end and accompanying replacement tube are passed through the tube sheet opening and is aligned with and inserted into the existing tube end. The positioning tool forward end is anchored in the existing tube end by hydraulically pressurizing the tool, after which the tool is further pressurized and the new replacement tube forced axially forward into interfitting engagement with the existing tube end. Then, the lower or rear end of the replacement tube is expanded firmly against the opening in the tubesheet after which the tube positionig tool is withdrawn from the heat exchanger Next, a tube expansion tool is inserted into the replacement tube and the forward end of the replacement tube is expanded outwardly against the inner surface of the existing tube end to provide a tight fitting contact therebetween for reliable welding, after which the expansion tool is withdrawn. Following such expansion of the tube joint between the replacement tube and existing tube end, the replacement tube end is remotely welded into the existing tube end and to the tubesheet.

Characteristics of typical heat exchanger tubes which have been replaced using the present invention are as follows:

| Tube outer ida., in. | 0.875 |
|---|---|
| Tube wall thickness, in. | 0.050 |
| Tube sheet thickness, in. | 21 |
| Length of replacement tube, in. | 36 |

Although this invention has been described broadly and in terms of a preferred embodiment, it is understood that modification and variations can be made within the scope of the invention which is defined by the following claims.

I claim:

1. A method for remotely removing and replacing a tube end portion attached to a tubesheet of a heat exchanger, comprising:
   (a) inserting a rotary cutting tool into a tube end portion and circumferentially severing the tube wall at a selected location near the tubesheet;
   (b) removing a weld joint located between the tube end portion and the tube sheet;
   (c) withdrawing the tube end portion out through the surrounding opening in the tubesheet;
   (d) inserting a new replacement tube into the tubesheet opening and axially positioning the new tube in axial alignment and interfitting engagement with the existing tube end;
   (e) expanding the outer end of the new tube firmly into the surrounding tubesheet opening, so as to hold the new tube in position;
   (f) expanding the inner end of the replacement tube into the existing tube end;
   (g) welding the new tube inner end to the existing tube end to provide a pressure-tight joint therebetween; and
   (h) welding the new tube outer end to the tubesheet to provide a pressure-tight joint therebetween.

2. A tube replacement method according to claim 1, wherein the tube end portion is rotary honed internally to remove deposits before inserting a cutting tool and severing the tube.

3. A tube replacement method according to claim 1, wherein the weld joint located between the tube end portion and the tubesheet is removed by remote machining with a rotary tool.

4. A tube replacement method according to claim 1, wherein the existing tube exposed end is remotely machined using a rotary cutting tool, then inserting and positioning the new replacement tube in alignment with the existing tube.

5. A tube replacement method according to claim 4, wherein the tube outer wall is scraped and the tube end is machined to a 40-50° angle with the tube centerline.

6. A tube replacement method according to claim 1, wherein the new tube inner end is swaged radially inwardly before being inserted into the existing tube end.

7. A tube replacement method according to claim 1, wherein the new tube is welded to the existing tube end using a remotely operated welding torch.

8. A tube replacement method according to claim 1, wherein the welding joint between the new tube and the existing tube is stress relieved.

9. A tube replacememt method according to claim 1, wherein said tube end portion is located in the lower end of a vertically oriented heat exchanger.

10. A method for remotely removing and replacing a tube end portion attached to a heat exchanger tubesheet, said method comprising:
   (a) inserting a rotary honing tool into a tube end portion and honing the tube to remove deposits therein;
   (b) inserting a rotary cutting tool into the tube end and circumferentially cutting through the tube wall at a selected location near the tubesheet;
   (c) removing a weld joint located between the tube end portion and the tubesheet;
   (d) withdrawing the tube end portion out through the surrounding opening in the tubesheet;
   (e) inserting a rotary cutting tool and remotely machining the exposed end of the existing tube to a 40-50° angle;
   (f) inserting a new replacement tube into the tubesheet opening and axially positioning the new tube in axial alignment and in interfitting engagement with the existing tube end;
   (g) expanding the outer end of the new tube firmly into the surrounding tubesheet opening so as to maintain alignment of the new tube therein;
   (h) expanding the swaged inner end of the replacement tube firmly into the existing tube end;
   (i) welding the new tube inner end to the existing tube end to provide a pressure-tight joint therebetween;
   (j) welding the new tube outer end to the tubesheet to provide a pressure-tight joint therebetween; and
   (k) stress relieving the weld joints between the existing tube end and the replacement tube.

* * * * *